(12) United States Patent
Roberts et al.

(10) Patent No.: US 10,693,188 B2
(45) Date of Patent: Jun. 23, 2020

(54) THERMALLY RESPONSIVE ELECTROLYTES

(71) Applicant: CLEMSON UNIVERSITY, Clemson, SC (US)

(72) Inventors: Mark E Roberts, Clemson, SC (US); Jesse C Kelly, Clemson, SC (US)

(73) Assignee: Clemson University, Clemson, SC (US)

( * ) Notice: Subject to any disclaimer, the term of this patent is extended or adjusted under 35 U.S.C. 154(b) by 714 days.

(21) Appl. No.: 14/926,213

(22) Filed: Oct. 29, 2015

(65) Prior Publication Data

US 2016/0126590 A1    May 5, 2016

Related U.S. Application Data

(60) Provisional application No. 62/072,622, filed on Oct. 30, 2014.

(51) Int. Cl.
| | |
|---|---|
| *H01M 10/05* | (2010.01) |
| *H01M 10/0564* | (2010.01) |
| *H01M 10/0525* | (2010.01) |
| *H01M 10/0568* | (2010.01) |
| *H01M 10/0569* | (2010.01) |

(52) U.S. Cl.
CPC ... *H01M 10/0564* (2013.01); *H01M 10/0525* (2013.01); *H01M 10/0568* (2013.01); *H01M 10/0569* (2013.01); *H01M 2220/20* (2013.01); *H01M 2300/0028* (2013.01); *H01M 2300/0037* (2013.01); *Y02E 60/122* (2013.01)

(58) Field of Classification Search
CPC ......... H01M 10/0564; H01M 10/0569; H01M 10/0568; H01M 10/0525; H01M 2300/0028; H01M 2300/0037; H01M 2220/20; H01M 10/0566; H01M 10/0565; H01M 10/4235
See application file for complete search history.

(56) References Cited

U.S. PATENT DOCUMENTS

| | | | | |
|---|---|---|---|---|
| 2005/0287441 A1* | 12/2005 | Passerini | ............... | H01B 1/122 429/307 |
| 2009/0286163 A1* | 11/2009 | Shin | .................... | H01M 4/5815 429/315 |
| 2016/0093923 A1* | 3/2016 | Wang | .................. | H01M 10/052 429/302 |

FOREIGN PATENT DOCUMENTS

CN    103123958    3/2015

OTHER PUBLICATIONS

Kumar et al. "Lithium ion transport and ion-polymer interaction in PEO based polymer electrolyte plasticized with ionic liquid." by Kumar et al., Solid State Ionics 201 (2011) 73-80, published Sep. 2011. (Year: 2011).*

Kelly et al. "Reversible Control of Electrochemical Properties Using Thermally-Responsive Polymer Electrolytes." Adv. Mater. 2012, 24, 886-889 by Kelly et al., published Jan. 2012 (Year: 2012).*

(Continued)

*Primary Examiner* — Michael L Dignan
(74) *Attorney, Agent, or Firm* — Coats & Bennett, PLLC (57) ABSTRACT

Methods compositions for controlling lithium-ion cell performance, using thermally responsive electrolytes incorporating compounds that exhibit a phase transition at elevated temperatures and are suited for incorporation into lithium-ion and lithium-metal cells are disclosed.

22 Claims, 9 Drawing Sheets

(56) References Cited

OTHER PUBLICATIONS

Lee et al. "Unusual Lower Critical Solution Temperature Phase Behavior of Poly(ethylene oxide) in Ionic Liquids" Macromolecules 2012, 45, 3627-3633 (Year: 2012).*
White et al. "Origins of Unusual Phase Behavior in Polymer/Ionic Liquid Solutions" Macromolecules 2013, 46, 5714-5723 (Year: 2013).*
Kelly et al. "Responsive electrolytes that inhibit electrochemical energy conversion at elevated temperatures." J. Mater. Chem. A 2015, 3, 4026-4034 (Year: 2015).*
Ye et al. "Ionic liquid polymer electrolytes" J. Mater. Chem. A, 2013, 1, 2719-2743 (Year: 2013).*
Shin et al. "PEO-Based Polymer Electrolytes with Ionic Liquids and Their Use in Lithium Metal-Polymer Electrolyte Batteries." J. Electrochem. Soc. 2005, 152, A978-A983 (Year: 2005).*
Hau-Nan Lee and Timothy P. Lodge; Article entitled: Poly(N-Butyl Methacrylate) in Ionic Liquids With Tunable Lower Critical Solution Temperatures (LCST); from ACS Publications, published Jan. 15, 2011, pp. 1971-1977.
Ronald P. White and Jane E. G. Lipson; article entitled: Marcomolecules—Origins of Unusual Phase Behavior in Polymer/Ionic Liquid Solutions from ACS Publications, published Jul. 5, 2013, pp. 5714-5723.
Yiyong He and Timothy P. Lodge; article entitled: A Thermoreversible Ion Gel by Triblock Copolymer Self-Assembly in an Ionic Liquid from Chem. Commun, published May 3, 2007, pp. 2732-2734.
Yahong Zhou, Wei Guo, Jinsheng Cheng, Yang Liu, Jinghong Li, and Lei Jiang; article entitled: High-Temperature Gating of Solid-State Nanopores With Thermo-Responsive Macromolecular Nanoactuators in Ionic Liquids, from Advanced Materials, wileyonlinelibrary.com, published Jan. 18, 2012, pp. 962-967.
Ryohei Tsuda, Koichi Kodama, Takeshi, Ueki, Hisashi Kokubo, Shin-Ichiro Imabayashi and Masayoshi Watanabe; article entitled: LCST-Type Liquid-Liquid Phase Separation Behavior of Poly(Ethylene Oxide) Derivatives in an Ionic Liquid from Communication, The Royal Society of Chemistry, www.rsc.org/chemcomm, published Aug. 28, 2008, pp. 4939-4941.
Hau-Nan Lee and Timothy P. Lodge; article entitled: Lower Critical Solution Temperature (LCST) Phase Behavior of Poly(Ethylene Oxide) in Ionic Liquids from The Journal of Physical Chemistry Letters, American Chemical Society, published Jun. 11, 2010, pp. 1962-1966.
Ueki and Watanabe; article entitled: Lower Critical Solution Temperature Behavior of Linear Polymers in Ionic Liquids and the Corresponding Volume Phase Transition of Polymer Gels from 2007 American Chemical Society, published Dec. 22, 2006, pp. 988-990.
Takeshi Ueki, Asako Ayusawa Arai, Koichi Kodama, Sayaka Kaino, Noriko Takada, Takeshi Morita, Keiko Nishikawa, and Masayoshi Watanabe; article entitled: Thermodynamic Study on Phase Transitions of Poly(Benzyl Methacrylate) in Ionic Liquid Solvents from Pure Appl. Chem., published Sep. 26, 2009, pp. 1829-1841.
Yiyong He and Timothy P. Lodge; article entitled: Thermoreversible Ion Gels With Tunable Melting Temperatures From Triblock and Pentablock Copolymers from Macromolecules 2008, American Chemical Society, published Dec. 8, 2007; pp. 167-174.
Hau-Nan Lee, Nakisha Newell, Zhifeng Bai, and Timothy P. Lodge; article: Unusual Lower Critical Solution Termperature Phase Behavior of Poly(Ethylene Oxide) in Ionic Liquids, from Macromolecules, ACS Publications, American Chemical Society, published Apr. 10, 2012, pp. 3627-3633.
Wenlong Li and Peiyi Wu; article entitled: Unusual Phase Transition Mechanism of Poly(Ethylene Oxide) in an Ionic Liquid: Opposite Frequency Shifts in C-H Groups from Soft Matter, RSC Publishing, The Royal Society of Chemistry 2013, published Oct. 10, 2013, pp. 11585-11597.
Celina Mikolajczak, PE, Michael Kahn, Ph.D., Kevin White, Ph.D., Richard Thomas Long, PE; article entitled: Lithium-Ion Batteries Hazard and Use Assessment Final Report from the Fire Protection Research Foundation, Jul. 1, 2011; pp. 0-11.

* cited by examiner

FIG. 1a.1

Heat through LCST

FIG. 1a.2

Time and Temperature

THERMALLY RESPONSIVE ELECTROLYTES

TECHNOLOGICAL FIELD

The present disclosure relates to methods, systems and apparatuses for energy storage. More particularly the present disclosure relates to improvements in lithium ion battery technology comprising the introduction of thermally responsive polymer electrolytes.

BACKGROUND

Increasing energy demands, along with the need to use energy from intermittent, renewable resources has led to a continued interest in the field of energy storage and delivery, including the field of batteries. Such energy devices must safely deliver required energy output for many uses, including transportation and portable power systems. Lithium-ion and lithium metal batteries have emerged as one candidate to meet such demands.

The term "lithium-ion battery" or "lithium-ion cell" encompasses batteries where the anode and cathode materials act as a host for the lithium ion ($Li^+$) and the terms are used equivalently and interchangeably throughout this disclosure. Lithium ions migrate from the anode to the cathode during discharge and are inserted into the voids in the crystallographic structure of the cathode. The ions reverse direction during charging. Alternating layers of anode and cathode are separated by a porous film, known as a separator. An electrolyte, typically comprising an organic solvent along with dissolved lithium salt provides the media for the lithium ion transport. Lithium-ion cells can be made by stacking alternating layers of electrodes, or by winding long strips of electrodes into a roll configuration (typical for cylindrical cells). Electrode stacks or welds are typically inserted into hard cases that are sealed with gaskets, laser-welded hard cases, or enclosed in foil pouches and heat-sealed. Lithium batteries are similar in principle to lithium-ion batteries, but are often single-use primary batteries with lithium metal anodes that offer high energy density. For purposes of this application, lithium metal batteries are included in the general category of "lithium ion" batteries, and the advantages of the present disclosure are understood to apply also to lithium metal batteries. It is further understood, for the purposes of this application, that the terms "lithium ion cell" and "lithium ion battery" are used interchangeably, with equivalent meaning.

Lithium-ion cells in today's market therefore have similar designs featuring a negative electrode (anode) made from carbon/graphite coated onto a copper current collector, a metal oxide positive electrode (cathode) coated onto an aluminum current collector, a polymeric separator, and an electrolyte comprising a lithium salt in an organic solvent.

Lithium-ion cells have a safe operating voltage range over which it can be cycled that is determined by specific cell chemistry. The safe operating range is a range where the cell electrodes will not rapidly degrade due to lithium plating onto the electrodes, will not undergo copper dissolution, or sustain other undesirable reactions, including thermal runaway, for example.

Typical electrolytes feature a mixture of organic carbonates such as ethylene carbonate or diethyl carbonate. The mixture ratios vary depending on the desired cell properties. The electrolytes comprise lithium-ions provided to the electrolyte in the form of lithium salts, such as, for example, lithium hexafluorophosphate ($LiPF_6$).

Typical lithium-ion cells may also contain various additives to increase the performance, stability and safety, such as, for example, additives that act as flame retardants, overcharge protectors, cathode protection agents, lithium salt stabilizers or corrosion inhibitors.

During normal device operation, the temperature of lithium ion cells increases as a result of the exothermic lithium reactions, and cells are designed to efficiently transport the heat to the outside of the cell. Problems within the cell can cause the internal temperature to increase beyond an acceptable limit, which causes the lithium reaction rates to increase, further increasing the temperature of the cell. Most lithium-ion cells are not designed to withstand temperatures above approximately 60° C. during operation or storage. Most commercial lithium-ion cell contain chemistries resulting in breakdown occurring in the temperature range of from about 75° C. to about 90° C., during the time discharge rates are high.

Thermal runaway refers to cell conditions where rapid self-heating of the cell occurs due to the inherent exothermic chemical reaction of the highly oxidized cathode and the highly reducing anode. In a thermal runaway reaction, a cell rapidly releases stored energy. Since lithium-ion cells have high energy densities and flammable electrolytes, lithium-ion cell thermal runaway can be dangerous, and will at least lead to the destruction of the cell, and could contribute to conditions that could lead to the destruction of the device being powered. Certainly, when cells are arranged in series to discharge power, thermal runaway in one cell can damage adjacently-positioned cells.

Attempts to achieve lithium-ion cell shutdown (as a safety measure) in the event of thermal runaway have focused on separator technology or the use of solid-state electrolytes. Lithium-ion cell separators are typically made from porous polymers including polyethylene, polypropylene, or combinations thereof. The separators act to prevent the direct contact between the anode and cathode. The pores in the separators allow the cyclical transport of lithium ions during alternating charge and discharge cycles via diffusion through the separator. When temperatures elevate above a predetermined "safe" operating temperature, many separators are designed to soften, thus closing the pores, and stopping lithium ion transport through the separator. While such a shutdown of the cell can inhibit the threat of thermal runaway from occurring, the shutdown permanently disables the cell in the case of an internal temperature rise. In addition, at certain internal temperatures, the separators may melt entirely, which cannot only lead to permanent cell failure, but also risks fire or explosion. Similarly, the use of solid state electrolytes has been proposed, where low ionic conductivity limits cell performance (particularly the power density of the cell). However, like the proposed separators, thermal decay occurs at elevated temperatures. While this potentially improves safety by reducing the chance of fire or explosion, the mechanisms triggering such safety measures render the cells useless.

Managing heat generation in small format lithium-ion cells has become relatively routine due to the cells' limited size. This has resulted in limited risk of thermal failure. Therefore, some commercially available cells adopt arrays of small format cells. However, large format lithium-ion cells have shown an increased risk of catastrophic thermal failure due to, for example, high surface contact between electrode and electrolyte, high amount of heat generated in a confined space, and large distances to dissipate heat from the cell. Further, limitations in thermal management have limited the size and scale of secondary lithium-ion batteries.

Methods and apparatuses for lithium-ion cells that could ameliorate or impede internal temperature rises, and reduce the hazards of thermal runaway would be highly advantageous. Further, methods for impeding thermal runaway while also preserving the function of the lithium-ion cell itself would be also highly advantageous.

SUMMARY

According to one aspect, the present disclosure is directed to methods for controlling lithium-ion cell performance comprising a lithium-ion cell, with the cell comprising a thermally responsive electrolyte that exhibits a predetermined phase transition at a temperature of from about 50° C. to about 160° C. The terms lithium-ion cell and lithium-ion battery are understood to be equivalent terms for purposes of the present application. Further, lithium metal batteries and cells are understood to be included in the term lithium-ion cells for purposes of the present application.

The contemplated phase transition can be reversible or irreversible. Therefore, according to one aspect, the phase transition is reversible.

In a still further aspect, the thermally responsive electrolyte comprises a thermally responsive polymer, a solvent and a lithium salt, with the thermally responsive electrolyte exhibiting a predetermined phase transition at a temperature of from about 50° C. to about 160° C.

In another aspect, the thermally responsive polymer is selected from the group consisting of: polyethylene oxide and other polyether derivatives; poly(aryl methacrylates), where aryl denotes an aromatic group, such as poly(benzy methacrylates); poly(-alkyl methacrylates), where alkyl denotes any hydrocarbon side group such as, without limitation, poly(n-butyl methacrylates); poly(-alkyl acrylamides); poly(n-isopropylacrylamides), and other poly(methacrylate) derivatives, poly(ionic) liquids, copolymers or cross-linked polymers of these aforementioned materials, and combinations thereof.

In another aspect, the thermally responsive electrolyte comprises a thermally responsive polymer selected from the group consisting of poly(ethylene oxide) and other polyether derivatives; poly(aryl methacrylates), poly(alkyl methacrylates) and other poly(methacrylate) derivatives, poly(ionic liquids), copolymers or cross-linked polymers therein, and combinations thereof.

In yet another aspect, the solvent is an ionic liquid selected from the group comprising of imidazolium-, pyrrolidinium-, phosphonium-, ammonium- and sulfonium-based ionic liquids, and combinations.

In a further aspect, the thermally responsive electrolyte further comprises a lithium salt, with the lithium salt selected from the group consisting of lithium tetrafluoroborate, lithium hexafluorophosphate, lithium bis(trifluoromethanesulfonyl)imide (also referred to herein as "LiTFSI"), lithium perchlorate, or any lithium salt, and combinations thereof.

In a still further aspect, the phase transition occurs at a temperature less than a temperature required to damage a lithium-ion cell separator. Such temperature typically occurs between from about 100° C. to about 160° C.

In another aspect, the thermally responsive electrolyte inhibits conductivity within the lithium-ion cell when the temperature of the electrolyte is in the temperature range of from about 50° C. to about 160° C.

In yet another aspect, the phase transition of the thermally responsive electrolyte inhibits lithium-ion transport in the electrolyte.

In another aspect, the thermally responsive electrolyte inhibits the charge transfer or ion intercalation when the temperature of the electrolyte is in the range of from about 50° C. to about 160° C.

In yet another aspect, the phase transition of the electrolyte inhibits ion transport in the electrolyte.

In a still further aspect, the present disclosure is directed to a lithium-ion cell or a lithium-metal cell comprising a thermally responsive electrolyte. The electrolyte exhibits a phase transition at a temperature of from about 50° C. to about 160° C.

In another aspect, the present disclosure is directed to a lithium-ion cell or a lithium-metal cell comprising a thermally responsive electrolyte, with the electrolyte comprising a thermally responsive polymer, a thermally stable solvent, and a lithium salt, wherein the thermally responsive polymer in the solvent exhibits a predetermined phase transition at a temperature of from about 50° C. to about 160° C.

In another aspect, the thermally responsive electrolyte comprises a thermally responsive polymer, a thermally stable solvent, and a lithium salt, and wherein the thermally responsive electrolyte exhibits a predetermined phase transition at a temperature of from about 50° C. to about 160° C.

In yet another aspect, the thermally responsive polymer is selected from the group consisting of poly(ethylene oxide) and other polyether derivatives; poly(aryl methacrylates), where aryl denotes any aromatic group, such as poly(benzyl methacrylate); poly(alkyl methacrylates), where alkyl denotes any hydrocarbon side group, such as poly(n-butyl methacrylate), poly(-alkyl acrylimides), where alkyl denotes any hydrocarbon side group, such as poly(n-isopropylacrylamide), and other poly(methacrylate) derivatives, poly (ionic liquids), copolymers or cross-linked polymers of these materials, and combinations thereof.

In another aspect, the thermally responsive polymer has an average molecular weight of from about 1,000 to about 1,000,000.

In yet another aspect, the preferred solvent is an ionic liquid selected from the group consisting of imidazolium-, pyrrolidinium-, pyridinium-, phosphonium-, ammonium-, and sulfonium-based ionic liquids and combinations thereof. However, it is understood that, acting as the cation, the ionic liquid may comprise many other compounds.

In a further aspect, the lithium salt is selected from the group consisting of: lithium tetrafluoroborate, lithium hexafluorophosphate, lithium bis(trifluoromethanesulfonyl) imide, lithium perchlorate, or any lithium salt, and combinations thereof.

According to a further aspect, the present disclosure is directed to a thermally responsive electrolyte comprising a thermally responsive polymer, a thermally stable solvent, and a lithium salt.

In a further aspect, the thermally responsive electrolyte of is selected from the group consisting of: poly(ethylene oxide) and other polyether derivatives; poly(aryl methacrylates), poly(alkyl methacrylates), and other poly(methacrylate) derivatives, poly(ionic liquids), copolymers or cross-linked polymers therein, and combinations thereof.

In yet another aspect, the thermally responsive electrolyte has an average molecular weight of from about 1000 to about 1,000,000.

In a still further aspect, the phase transition occurs at a temperature less than a temperature required to damage a lithium-ion cell separator, which occurs at a temperature of between from about 100° C. and 160° C.

In another aspect, the thermally responsive electrolyte exhibits a predetermined phase transition at a temperature of from about 50° C. to about 160° C.

In yet another aspect, a polyethylene oxide-containing compound in the thermally responsive electrolyte exhibits a predetermined phase transition at a temperature ranging from about 50° C. to about 160° C.

In another aspect, the thermally responsive electrolyte inhibits conductivity within the lithium-ion cell when the temperature of the electrolyte is in the temperature range of from about 50° C. to about 160° C.

In yet another aspect, the phase transition of the thermally responsive electrolyte inhibits lithium-ion transport in the cell.

In another aspect, the present disclosure is directed to a thermally responsive electrolyte, with the electrolyte exhibiting a phase transition with increasing temperature of from about 50° C. to about 160° C. The phase transition may be a solid-liquid or a liquid-liquid phase separation. In one aspect, the thermally responsive electrolyte comprises a thermally responsive polymer, a thermally stable solvent, and a lithium salt.

In another aspect, the thermally responsive polymer comprises a polyether-containing compound or poly(methacrylate)-containing compound, a solvent, and a lithium salt.

In another aspect, the thermally responsive polymer is selected from the group consisting of: poly(ethylene oxide) and other polyether derivatives; poly(aryl methacrylates), where aryl denotes any aromatic group, such as poly(benzyl methacrylate); poly(alkyl methacrylates), where alkyl denotes any hydrocarbon side group, such as poly(n-butyl methacrylate), poly(-alkyl acrylimides), where alkyl denotes any hydrocarbon side group, such as poly(n-isopropylacrylamide), and other poly(methacrylate) derivatives, poly (ionic liquids), copolymers or crosslinked polymers of these materials, and combinations thereof.

In yet another aspect, the solvent is an ionic liquid selected from the group consisting of imidazolium, pyrrolidinium, pyridinium, phosphonium, ammonium, and sulfonium based ionic liquids and combinations thereof.

In a further aspect, the lithium salt is selected from the group consisting of lithium tetrafluoroborate, lithium hexafluorophosphate, lithium bis(trifluoromethanesulfonyl) imide, lithium perchlorate or any lithium salt and combinations thereof.

In another aspect, the thermally responsive electrolyte exhibits a predetermined phase transition at a temperature of from about 50° C. to about 160° C.

In yet another aspect, the present disclosure is directed to a component comprising a lithium-ion cell or a lithium-metal cell comprising a thermally responsive electrolyte.

In another aspect, the electrolyte comprises a polyether-containing compound or a poly(methacrylate)-containing compound, a thermally stable ionic liquid, and a lithium salt. The polyether-containing compound, or the poly(methacrylate-containing compound exhibits a phase transition at a temperature of from about 50° C. to about 160° C.

In yet another aspect, the present disclosure is directed to a vehicle comprising a lithium-ion cell comprising a thermally responsive electrolyte.

In a further aspect, the electrolyte comprises a polyether-containing compound or a poly(methacrylate)-containing compound such as, for example a polyethylene oxide-containing compound, a thermally stable ionic liquid, and a lithium salt. The polyethylene-oxide-containing compound exhibits a phase transition at a temperature of from about 50° C. to about 160° C. It is further contemplated that the phase transition may occur at temperatures above about 160° C., if desired.

BRIEF DESCRIPTION OF THE DRAWINGS

Having thus described variations of the disclosure in general terms, reference will now be made to the accompanying drawings, which are not necessarily drawn to scale, and wherein:

FIGS. 1a.1 to 1a.3 are a series of three drawings showing RPE phase separation;

DETAILED DESCRIPTION

Presently known thermal management systems, including shutoff mechanisms for lithium-ion cells fail to adequately address safety hazards, and otherwise fail to address the permanent destruction of cell performance in the event a cell shutdown.

New and presently disclosed approaches overcome thermal runaway reactions that can result in fires and explosions, as well as lithium-ion cell failures. The present disclosure is directed to thermally responsive and reversible electrolyte solutions for use in lithium-ion cells comprising a thermally responsive electrolyte that exhibits a phase separation when the internal temperature of the cell increases. According to one aspect of the present disclosure, the thermally responsive electrolyte comprises a polymer, an ionic liquid and a lithium salt. The electrolyte solutions of the present disclosure provide a reversible mechanism for inhibiting lithium-ion cell operation when a temperature increases beyond a preselected temperature. When the preselected temperature occurs within a lithium-ion cell, the thermally responsive polymer undergoes a polymer-ionic liquid phase separation that is also reversible. Such a thermally induced phase separation causes a decrease in ion conductivity, thereby affecting the local concentration of ions at the electrode. In addition, an increase in charge transfer resistance occurs that is associated with phase-separated polymer impacting the electrode surface. The use of thermally responsive polymers dissolved in ionic liquids (ILs) provides thermally responsive electrolytes that offer thermal stability and chemical stability at normal operating temperatures to lithium-ion cells. The thermally responsive polymer electrolytes disclosed herein predictably and reproducibly inhibit conductivity and charge transfer at preselected elevated temperatures that ordinarily cause thermal instabilities in lithium-ion cells, yet maintain their formation when temperatures return to ambient conditions. The thermally responsive polymer electrolytes (RPEs) disclosed herein exhibit an inherent temperature-based control mechanism.

For purposes of this present application, lithium metal batteries are included in the general category of "lithium ion" batteries, and the advantages of the present disclosure are understood to apply also to lithium metal batteries. It is further understood, for the purposes of this application, that the terms "lithium ion cell" and "lithium ion battery" are used interchangeably, with equivalent meaning.

Polymers are particularly attractive for responsive systems as their molecular properties can be tailored to add functionality or change the extent to which a desired property can be altered. In polymeric materials, the molecular weight, structure, composition and function can be designed to tailor how the material will respond to external stimulus (e.g. pH, light, temperature, chemical composition, electric current, force, etc.) and influence a reversible change in the mechanical, electrical, chemical or optical properties. As disclosed herein, certain "smart" materials, such as mixtures of poly(ethylene oxide), or PEO in an ionic liquid such as, for example, 1-ethyly-3-methylimidazolium tetrafluoroborate ([EMIM][$BF_4$]), in the presence of lithium salts, offer a potential solution to overcome the thermal hazards associated with lithium-ion cells, while simultaneously avoiding the use of low performance systems or other destructive safety measures.

While bound to no particular theory, it is believed that the inherent temperature-based control mechanism arises from a change in electrolyte conductivity, and the composition at the electrode/electrolyte interface. The RPEs disclosed herein are further believed to permit the incorporation of high conductivity electrolyte systems in lithium-ion cells needed for, among other systems, large-format energy storage systems.

Figure 1A:
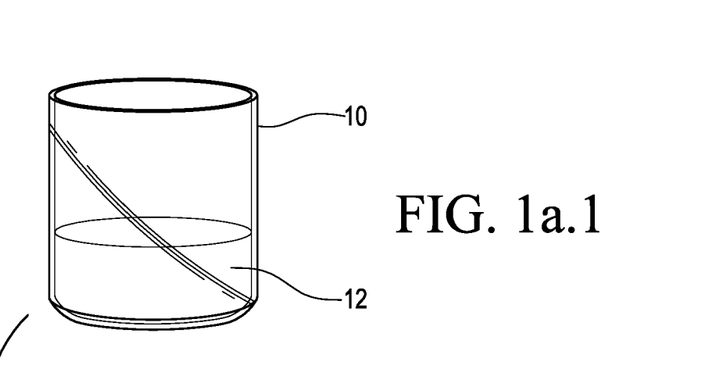

Thermally responsive polymer electrolytes were investigated by preparing PEO polymers with two distinct molecular weights (1,500 MW and 20,000 MW) in two PEO/IL weight compositions (80/20 and 50/50). These polymers are referred to hereinafter as PEO/IL(80/20), L-PEO/IL(80/20), PEO/IL(50/50) and L-PEO/IL(50/50), where composition is designated and the "low" MW (1,500 MW) PEO mixtures are labelled L-PEO/IL. When the PEO/IL mixtures are heated above their lower critical solution temperature (LCST), they separated into a low conductivity PEO-rich phase and a high conductivity IL-rich phase (FIG. 1a.1 to 1a.3). Below this temperature, the mixture displayed a high conductivity due to the low ionic resistivity of the IL and a favorable PEO/IL conductive pathway. Above the LCST of the solution, a liquid-liquid phase separation occurred in the PEO/IL mixture due to increasing entropic contributions to the free energy, consistent with traditional thermally responsive polymers. This separation resulted in a cloudy, opaque solution similar to the solid-liquid phase transition observed in aqueous poly(N-isopropylacrylamide) systems. Driven by density differences between the two materials (~1.3 for [EMIM][$BF_4$] and ~1.0 for PEO), the two liquids gradually separated into a biphasic mixture with time, and a further increase in temperature. Due to the high resistivity of PEO in the IL deficient top phase, a drastic decrease in conductivity across the system occurred due to the biphasic mixture. The change in solution properties and the extent to which the electrochemical behavior of electrochemical systems change with temperature were measured using the RPEs with carbon on stainless steel mesh electrodes (FIGS. 1b-1c).

Figure 1A:
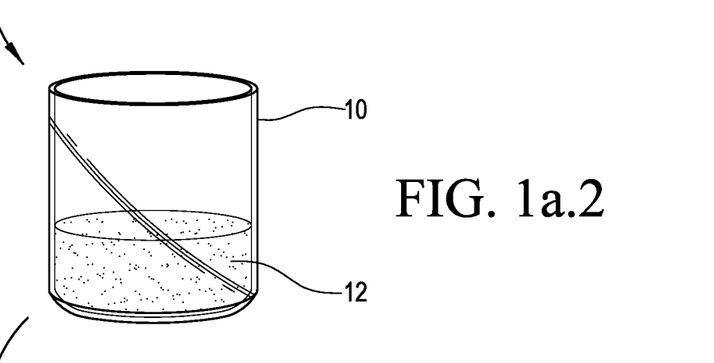
Figure 1A:
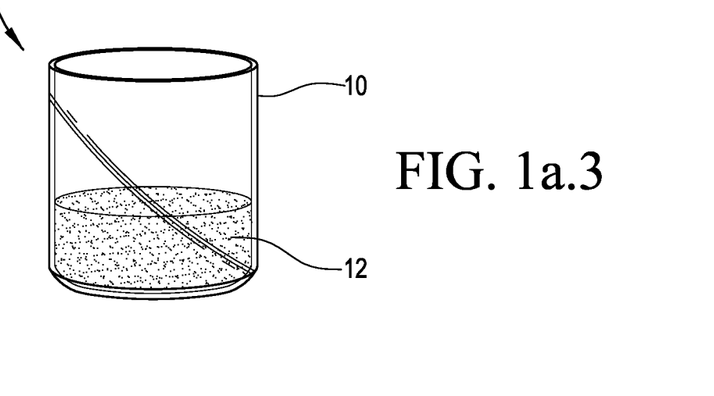

As shown in FIG. 1a.1, a beaker 10 contains an amount of PEO/IL solution 12. After heating above the solution's lower critical solution temperature (LCST), the solution 12 began to optically cloud, indicating the beginning of a phase separation. See FIG. 1a.2. After continued heating above the solution's lower critical solution temperature (LCST), the phase separation is clearly observed in solution 12, with the solution 12 separating into a low conductivity PEO-rich phase and a high conductivity IL-rich phase. See FIG. 1a.3.

According to aspects of the present disclosure, electrodes prepared by dispersing either mesoporous (MC) or activated carbon (AC), conductive graphite, and poly(vinylidene fluoride) in an 80/10/10 weight percent ratio in N-methyl-2-pyrrolidone. The resulting carbon pastes were then spread on 316 stainless steel sheets (60×60 mesh) and dried under vacuum. FIG. 1b shows an aspect of the present disclosure. A first drawing shows a stainless steel electrode 14 awaiting coating. In a second drawing, stainless steel electrode 14 has been coated with a carbon-containing coating 16.

Figure 1B:
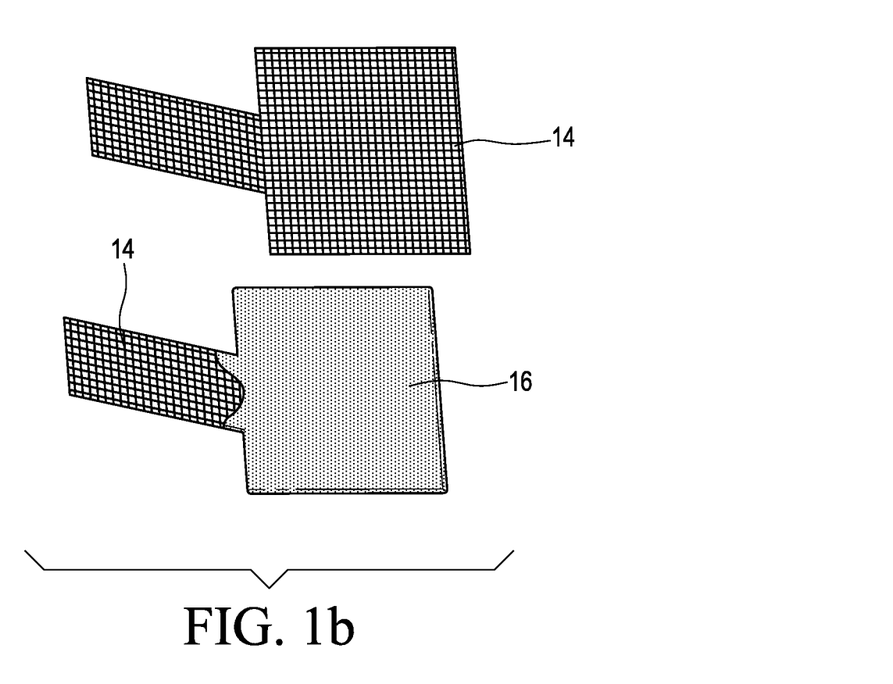
FIG. 1b shows two drawings of electrodes, one of which is carbon coated.
Figure 1C:
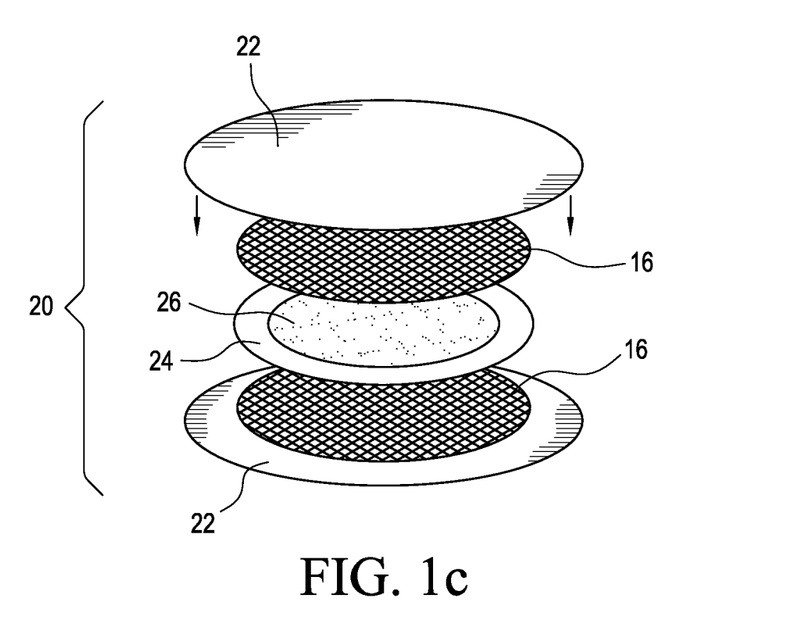
FIG. 1c is a schematic representation of an electrochemical test cell.

FIG. 1c shows a further aspect of the present disclosure wherein an electrode-electrolyte setup for electrochemical impedance spectroscopy measurements consisting of electrodes described in FIG. 1b and electrolyte confined within a 1 mm thick poly(ether ether ketone) (PEEK) spacer with an internal diameter of 12 mm. An electrochemical cell 20 is shown comprising outer casing 22 encasing electrodes 16 that sandwich a spacer 24 that comprises an electrolyte 26.

Figure 2A:
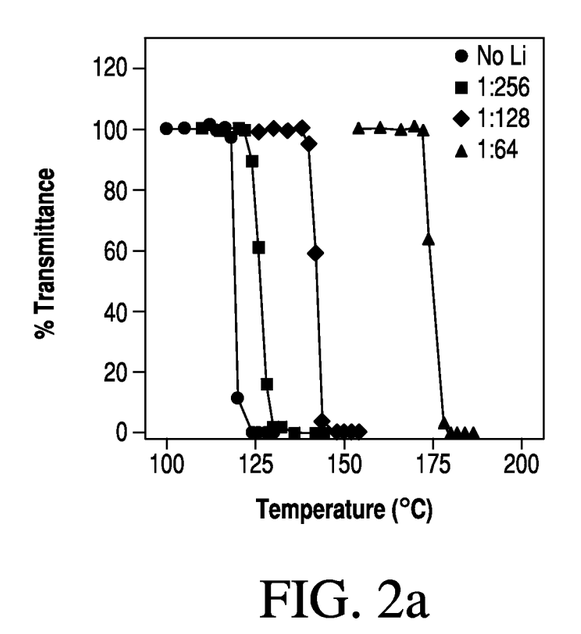
FIGS. 2a-2b are graphs showing temperature dependence of optical transmittance for RPEs.
Figure 2B:
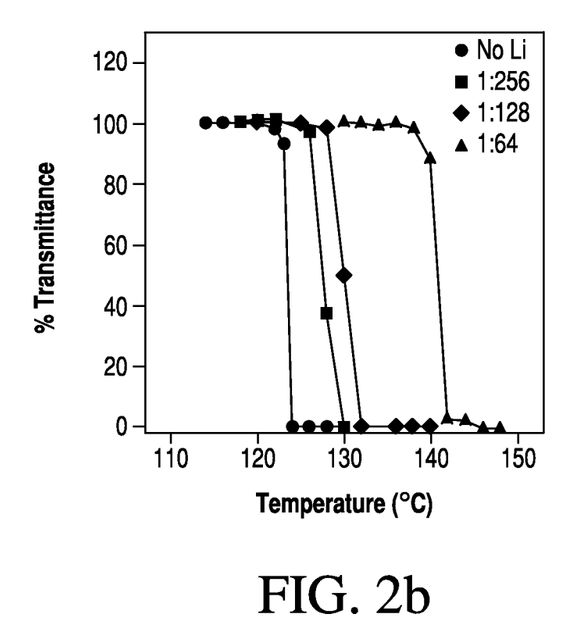

Cloud point (CP) measurements were performed in a $N_2$ purged cell equipped with a temperature control element in a UV-Vis spectrophotometer to determine the effect of the PEO, IL, and salt concentration on the phase behavior of the RPE systems. A transmittance of 100% indicated a well-mixed, single phase solution with a decrease in the transmittance (below 80%) indicated a thermal phase separation between the PEO and IL. FIGS. 2a-2b show the optical transmission behavior through the PEO/IL (80/20) and PEO/IL (50/50) RPEs. All RPE mixtures were well mixed, single phase solutions below 100° C. While both solutions containing the 20K MW PEO exhibited phase transitions (118° C. and 123° C. for the PEO/IL (80/20) and PEO/IL (50/50), respectively), a change in optical transmission was not observed in the 1.5K MW PEO mixtures within our setup, even for temperatures up to 190° C. These mixtures, however, showed a visual cloud point (188° C. and 174° C. for L-PEO/IL (80/20) L-PEO/IL (50/50), respectively), which is likely slightly higher than the onset of phase separation. CP measurements for the PEO/IL (80/20) and PEO/IL (50/50) were comparable to previously reported differential scanning calorimetry (DSC) measurements. The visual transitions observed for the low molecular weight solutions were slightly higher than their results for 2K MW polymers; however, this is expected for lower MW PEO.

The addition of lithium tetrafluoroborate ($LiBF_4$) to 20K MW PEO/IL (80/20) and PEO/IL (50/50) mixtures caused an increase in the LCST, which is referred to as the "salting in" effect. FIG. 2a shows that the addition of LiBF4 in Li:O (# of Li+ relative to O in PEO) ratios of 1:256, 1:128, and 1:64 to PEO/IL (80/20) mixtures results in an increase in CP from 11° C. (no salt) to 125° C., 141° C., and 173° C., respectively. At high concentrations (Li:O ratios of 1:16 and above), the LCST of PEO/IL (80/20) disappeared. The temperature range was maintained below 200° C., where PEO degradation is known to occur. FIG. 2b shows that the addition of the salt has a less pronounced effect on the LCST in the PEO/IL (50/50). The addition of $LiBF_4$ increases the CP from 123° C. (no salt) to 127° C., 129° C., and 140° C. for the 1:256, 1:128, and 1:64 Li:O ratios. The smaller effect of salt concentration observed in PEO/IL (50/50) is attributed to the overall lower molarity of Li+ within these solutions, due to a lower composition of PEO (and therefore O groups) relative to the 80/20 mixture. Similar to PEO/IL (80/20), high salt concentration mixtures (ratios of 1:16 and above), did not display LCST behavior.

Cloud point measurements for the 1.5K MW PEO with the lithium salt were not measured due to the high LCST temperatures observed for the L-PEO/IL (80/20) and L-PEO/IL (50/50) and the degradation point of PEO (approximately 190° C.-200° C.). These results indicate a strong correlation between phase separation temperature and the composition of each component, but more importantly, that the LCST can be tailored to achieve a target transition temperature. It should be noted that the liquid-liquid phase separation described herein, between PEO and IL with increased temperature, is a reversible process. In other words, as the temperature decreases, the mixture returns to its initial single phase system. Electrochemical impedance spectroscopy (EIS) measurements were performed in a test cell with stainless steel electrodes and a poly(ether ether ketone)(PEEK) spacer to determine how temperature and phase separation affect the RPE conductivity.

Figure 3A:
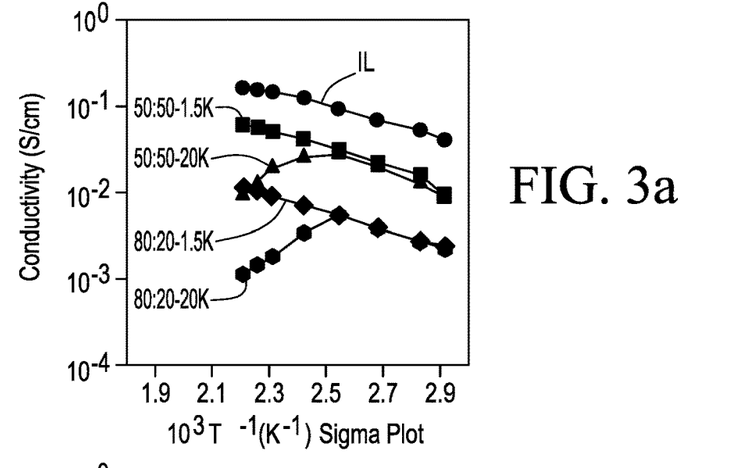
FIGS. 3a-3c are graphs showing temperature dependence of ionic conductivity for RPEs.
Figure 3B:
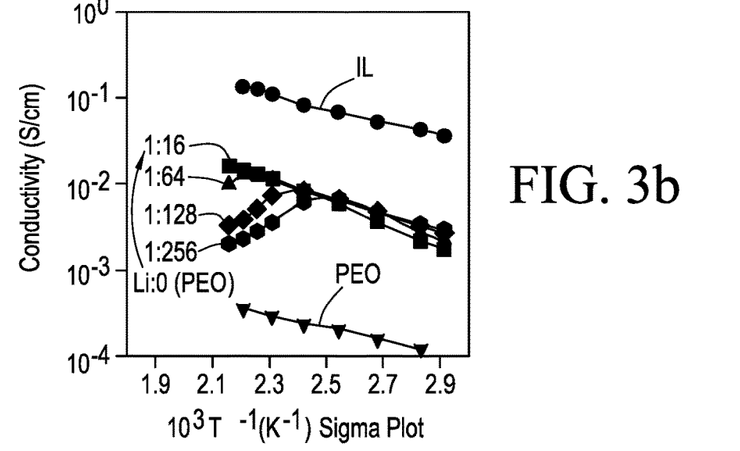
Figure 3C:
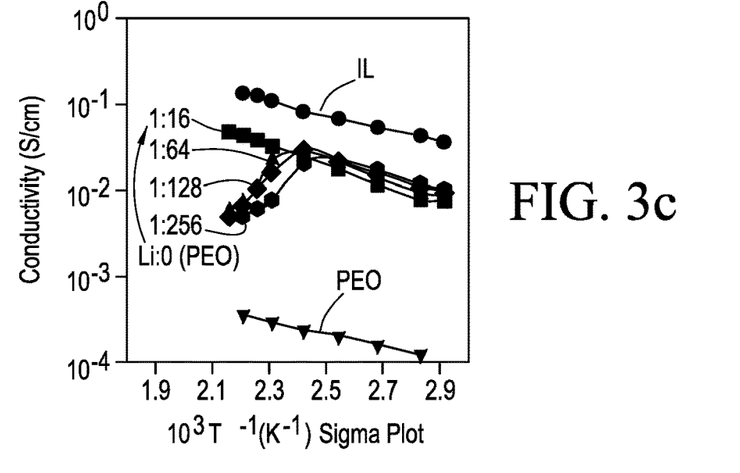

Ionic conductivity was determined from the corresponding resistive component of the impedance spectrum using a cell constant calibrated from a 1M NaCl solution at 25° C. FIG. 3a shows the measured conductivity of the salt free RPE systems as a function of temperature, composition, and PEO MW. For both the PEO/IL (80/20) and PEO/IL (50/50) systems, the conductivity rises slowly with temperature, similar to traditional aqueous and nonaqueous electrolytes. Above the LCST, a liquid-liquid phase separation occurs, resulting in PEO aggregation and a decrease in conductivity. As the temperature is further increased, nearly an order of magnitude reduction in conductivity is observed as the electrolyte segregates into the biphasic mixture (PEO-rich top, IL-rich bottom). Unlike the high MW mixtures, the L-PEO/IL (80/20) and L-PEO/IL (50/50) systems exhibited an increase in conductivity over the entire range of temperatures, similar to conventional electrolytes. These observations suggest that the very low molecular weight polymer mixtures do not efficiently phase separate (80-PEO(1.5):IL), even though visual changes are observed with the mixtures. Low MW polymers do not aggregate to the same extent as their high MW counterparts, therefore, the phase separated polymer domains fail to coalesce into the biphasic mixture, which is necessary to inhibit conductivity through the mixture. The effect of adding $LiBF_4$ to the PEO/IL (80/20) solutions is shown in FIG. 3b for Li:O ratios of 1:256, 1:128, 1:64, and 1:16. As the salt concentration is increased, the temperature at which the conductivity begins to decrease also increases, consistent with the CP measurements described above. At high concentrations (Li:O ratios of 1:16 and above), no change in conductivity was observed, as these compositions did not exhibit an LCST phase transition. FIG. 3c shows that increasing the LiBF4 concentration in PEO/IL (50/50) solutions resulted in an increase in the temperature at which conductivity changed. The shift in temperature is much less in PEO/IL (50/50) compared to PEO/IL (80/20), which is consistent with the CP measurements above and attributed to lower Li+ concentrations. Unlike traditional PEO-LiBF4 and IL-LIBF4 electrolytes, the RPE systems of the present disclosure show an abrupt decrease in conductivity near their LCST, except for high Li+ concentrations. As seen with CP experiments, the addition of the lithium salt can be used to control the point at which the LCST occurs and (along with composition and MW), which affects the temperature at which conductivity deactivates.

The application of RPE solutions in an energy storage cell was investigated using carbon coated stainless steel mesh electrodes. A symmetric 2-electrode cell was fabricated using carbon electrodes soaked in the RPEs overnight separated by a PEEK washer/spacer. Two types of carbons were investigated: mesoporous carbon (MC) with a low surface area and large pore diameter (50-100 m2/g, 13.7 nm) and activated carbon (AC) with a large surface area and small pore diameter (2000 m2/g, 2.1 nm). The mechanism for energy storage within these electrodes is electrical double layer capacitance (EDLC), where ions physically accumulate at the electrode/electrolyte interface in a non-Faradaic process (no charge transfer). Very high surface area carbons (AC) are capable of higher capacitance, but possess lower current rates and power density due to the highly disordered ionic pathway compared to low surface area materials with open porous structures (MC).

Figure 4A:
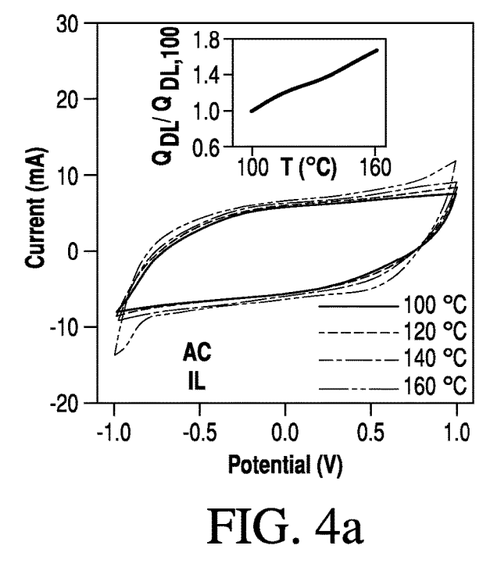
FIGS. 4a-4d are graphs showing temperature dependence of cyclic voltammetry profiles for selected RPEs.
Figure 4B:
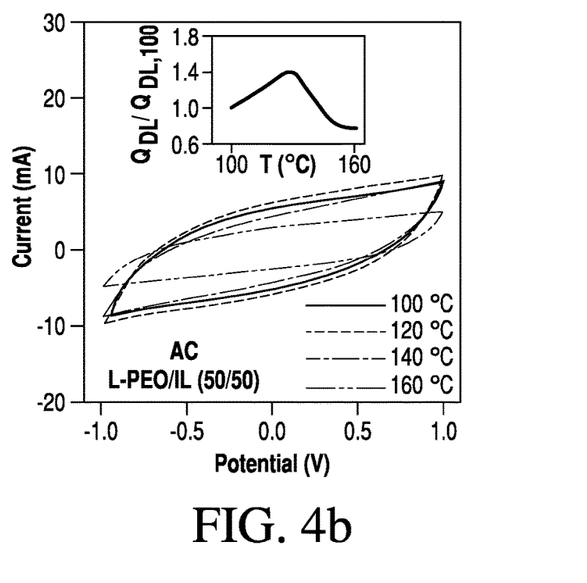

Cyclic voltammetry (CV) measurements were used to determine how the electrical double layer capacitance of carbon electrodes with PEO/IL electrolytes, which depends on accessible surface area and ion concentration, are affected by solution temperature. FIGS. 4a-4d show CV profiles of symmetric supercapacitors containing AC and MC carbon electrodes in pure IL and two of the RPEs of interest. For devices comprised of AC electrodes in pure IL, the measured CV current increases linearly with temperature from 100° C. up to 160° C., as expected (FIG. 4a). The integrated area under the profiles, which is a representation of the amount of charge stored, correspondingly increases with temperature, as shown in inset of FIG. 4a (charge values are normalized to the initial value at 100° C.). CV profiles of cells comprising AC electrodes in L-PEO/IL (50/50) electrolyte are shown in FIG. 4b while heating the system from 100° C. up to 160° C. Similar to the pure IL, the relative amount of charge stored in these electrodes initially increases between 100° C. and 120° C., consistent with an increase in ion conductivity. Although the L-PEO/IL (50/50) did not display a change in conductivity or a visual CP until above 174° C., the current observed during the CV cycling showed a significant decrease as the cell was heated about 120° C. As shown in FIG. 4b, the CV shows a decrease in current above 140° C., however, the shape of the CV suggests that ion diffusion is not a limiting factor (profile maintains a rectangular shape) and that either a loss of electrode area has occurred or an increase in resistance for charges entering the double layer has increased.

These observations support the hypothesis that the L-PEO/IL (50/50) electrolytes exhibit a thermally induced phase separation that cannot be detected cloud point measurements, where PEO aggregates in solution and within the electrode pores and then binds to the surface of the carbon. Although the conductivity of the electrolyte continues to increase with temperature (FIG. 3c), the formation of a PEO-rich phase or coating inside the nanopores of AC creates a barrier to charge insertion and accumulation at the electrode/electrolyte interface, resulting in a decrease in electrochemical activity. The inset in FIG. 4b shows that the charge capacity (or electrode capacitance) at 160° C. decreases to approximately 70% of its value at 100° C. To put this value in perspective, devices utilizing IL electrolytes exhibited a 1.7× increase in charge capacity, which suggests that the use of the L-PEO/IL electrolyte causes a 50% decrease the electrochemical activity relative to how the conductivity would increase in the absence of the phase separation.

Figure 4C:
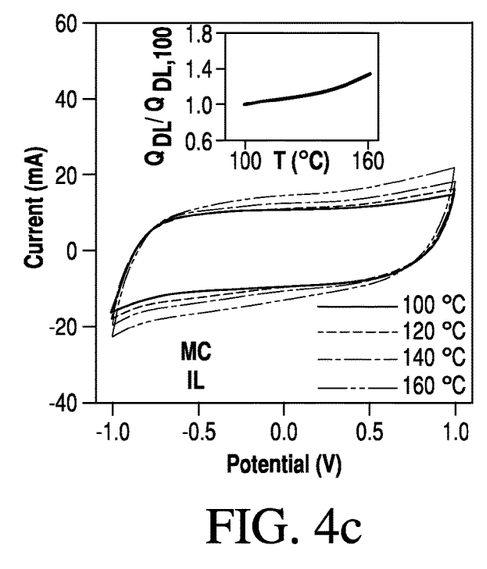
Figure 4D:
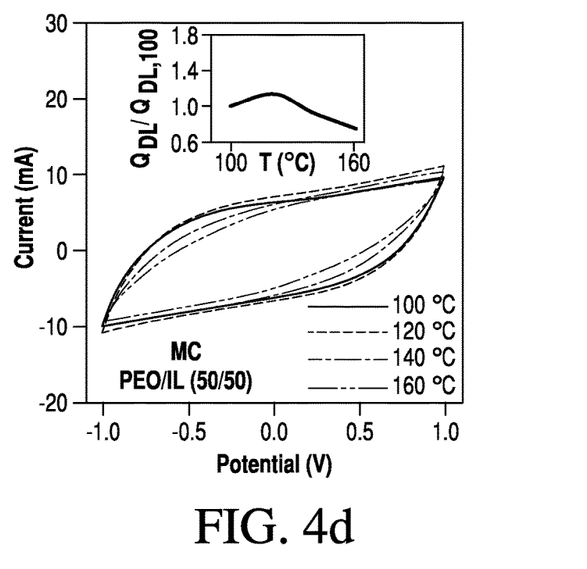

Comparable to devices comprised of AC electrodes in pure IL, cells containing MC electrodes exhibit a linear increase in charge capacitance with temperature, as shown in FIG. 4c. The electrochemical performance of cells using PEO/IL (50/50) electrolytes are shown in FIG. 4d over a temperature range of 100° C. to 160° C. The double layer capacitance of these devices initially increases until the cell reaches the LCST of 123° C., as observed in the devices with pure IL. Above this temperature, however, the electrical double layer capacitance decreases as a result of a decrease in conductivity change and the formation of a barrier to the charging of the electrode/electrolyte interface. Contrary to L-PEO/IL (50/50) devices that only exhibit a decrease in double layer capacitance, these devices exhibit a noticeable change in the CV profile shape (rectangular to egg-shaped) which is indicative of ion diffusion limitation characteristics.

The inset in FIG. 4d shows that the charge stored above 160° C. again decreases to approximately 70% of if its value at 100° C. These results demonstrate that the electrochemical processes occurring within an energy storage device can be limited with RPEs. Electrochemical impedance spectroscopy (EIS) measurements were performed to determine the mechanism for the decrease in electrochemical activity on AC and MC electrodes when the cell temperature is increased above the LCST of the respective electrolytes. Understanding the mechanism of ion adsorption and charge transfer inhibition is useful for further developing electrolyte materials and compositions that can be used to inhibit electrochemical devices that tend to overheat and exhibit thermal runaway, such as lithium-ion batteries. Measurements were carried out using symmetric cells of each electrode type in pure IL electrolytes (FIGS. 5a and 5d) and all four RPEs (FIGS. 5b, 5c and 5e, 5f). While CV measurements reveal changes in EDLC properties for one specific scan rate, EIS provides insight into device characteristics over a range of time-scales, which can be fit to extract resistive and capacitive components of the electrochemical processes. Carbon EDLCs are often modeled using de Levie's Transmission Line Model (TLM) equivalent circuit due to their highly porous and tortuous structure and intricate internal resistance. Here, we use a more simplified EIS model to reveal two important electrode/electrolyte characteristics: the ohmic resistance (RS), which is the intersection point with the x-axis in the high frequency region, and the internal resistance to charging the EDLC electrode/electrolyte interface or the "double layer" resistance. This internal resistance was determined with the use of the EIS data fitting program ZVIEW and applying a modified Randles circuit model (charge transfer and Warburg impedance in parallel to a capacitor) of the high- to mid-range frequency region. The in-series combination of the pseudo charge transfer resistance and Warburg impedance is referred to here as the "double layer" resistance (RDL). The pseudo charge transfer resistance results from the combination of various changes in solution conductivity and mobility of ions in the nano-structured carbon pores and the change in the electrode/electrolyte interface due to PEO physisorption.

Figure 5A:
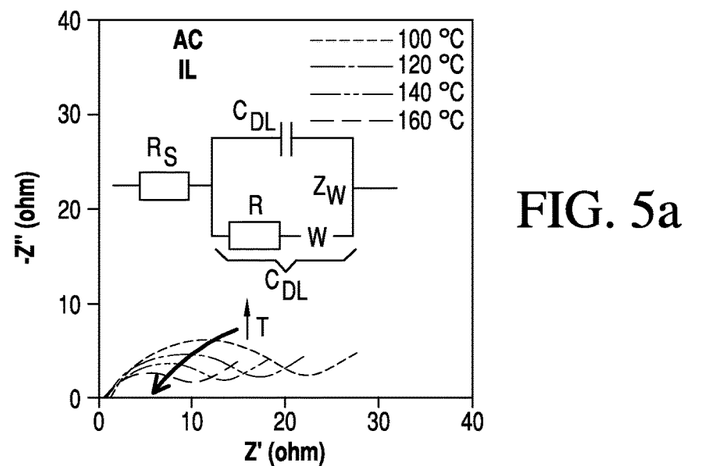
FIGS. 5a-f are graphs showing temperature dependence of electrochemical impedance spectroscopy measurements for RPEs.
Figure 5B:
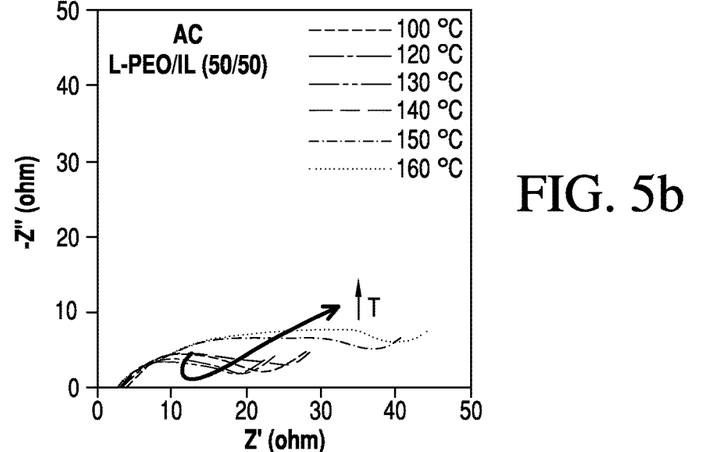

For the IL, L-PEO/IL (50/50) and PEO/IL (50/50) electrolytes on AC electrodes (FIGS. 5a-5c), EIS measurements reveal a relatively high internal "double layer" resistance (RDL) that results from the ion transport within the nanoscale pores of the AC. The Nyquist plots indicate that each electrolyte is highly dependent on this internal resistance over the frequencies down to 1 Hz, where characteristics of diffusion limited behavior are observed (45° slope in $-Z''$ vs $Z'$). In FIG. 5a, devices containing pure IL exhibit a RDL that decreases with increasing temperature due to the increase in ion conductivity, similar to conventional electrolyte solutions. Devices with AC electrodes in L-PEO/IL (50/50) initially show a decrease in RDL with increasing temperature (below the LCST) as evidenced by the slight decrease in high- to mid-range frequency semicircle radius (FIG. 5b).

Figure 5C:
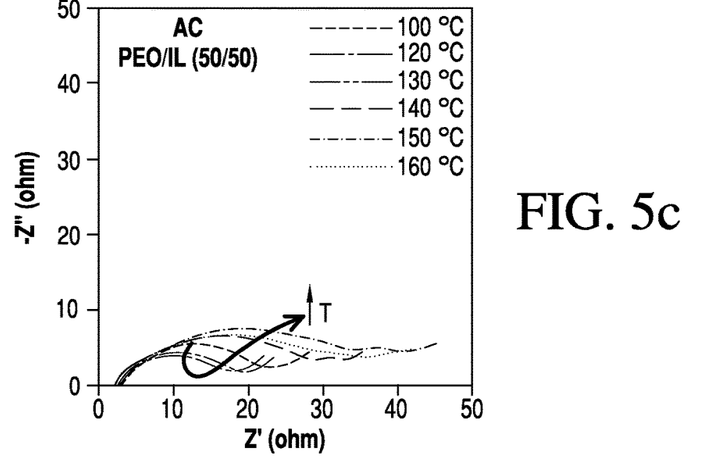
Figure 5D:
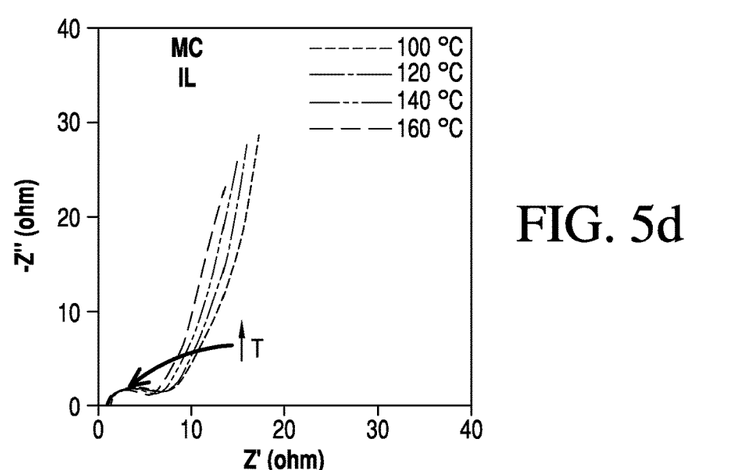

Even though we observed that the solution conductivity continues to increase above the LCST (FIG. 3a), from the EIS measurements, we found that semicircle radius of the Nyquist plot associated with RDL increases drastically, indicating an increase in double layer resistance. The increased resistance is attributed to an increased PEO concentration within the pores of the electrodes combined with polymer physisorption on the carbon surface, which supports our observations of decreased electrode capacitance. FIG. 5c shows that devices containing PEO/IL (50/50) display a similar but less significant trend.

Although the higher MW PEO system is capable of modulating the conductivity, the mixture contains PEO polymers that are larger than the AC pores thereby preventing the polymer from diffusing into and coating the pore walls. Without complete coverage or physisoprtion on the carbon surface (as observed with 1.5K MW PEO), the electrolyte containing 20K MW PEO has a limited effect on the double layer resistance in the nanoporous electrodes. Interestingly, these results confirm that electrochemical activity is strongly affected by polymer adsorption on the electrode interface as well as a decrease in ion conductivity above the phase transition temperature.

In devices comprising MC electrodes with IL, L-PEO/IL (50/50) and PEO/IL (50/50) electrolytes (FIGS. 5d-5f), EIS analysis reveals a much lower RDL (smaller hemisphere radius) as a result of the larger pore size and ion accessibility in the mesoporous carbon. Unlike in devices prepared with the AC electrodes, the limiting charging/discharging mechanism changes from RDL to ion diffusion at much higher frequencies, 10-20 Hz, indicating that these cells containing MC electrodes will be limited by ion mobility (conductivity) under most operating conditions. In these systems, we expect electrolyte conductivity to have a significant impact on the electrochemical activity.

Figure 5E:
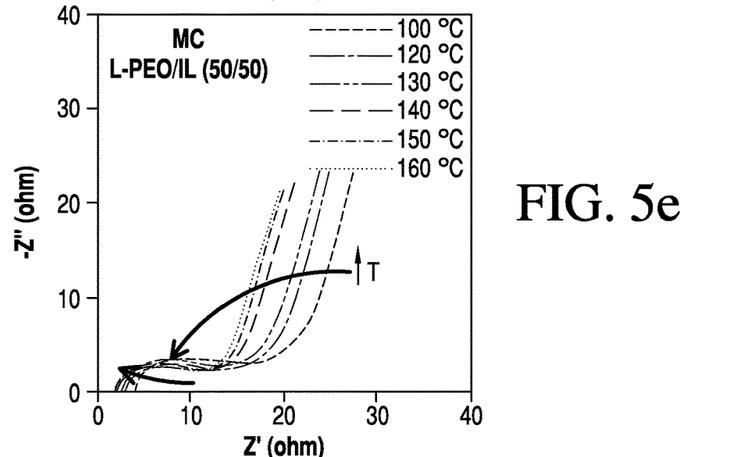
Figure 5F:
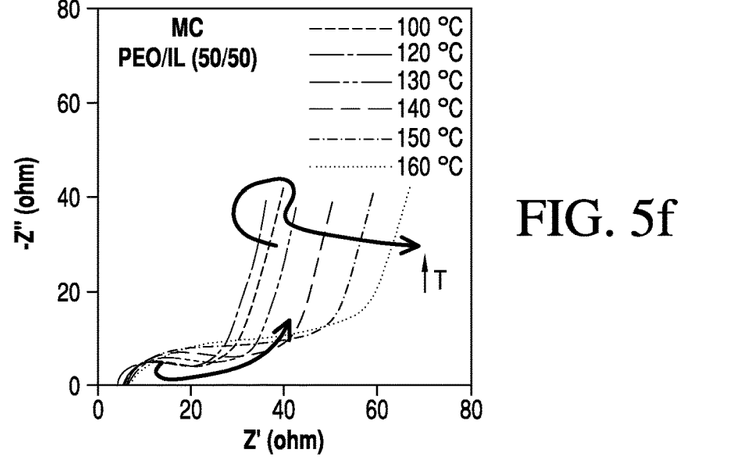

As disclosed herein, RDL decreases with increasing temperature in devices with pure IL electrolytes (FIG. 5d), which is similar to the behavior on AC electrodes. Since the mechanism on MC electrodes is governed by ion-transport rather than polymer adsorption, there is no significant change in RDL above the LCST of L-PEO/IL (50/50), as shown in FIG. 5e. In fact, the characteristics of the Nyquist plot are quite similar to results from devices with pure IL, as both electrolytes exhibit a continuous increase in conductivity with increasing temperature. The radius of the high- to mid-range frequency semicircle continues to decrease at temperatures up to 160° C., indicating a decrease in the RDL. Contrary to the behavior in devices with AC electrodes, electrolytes using low MW PEO do not seem to significantly affect the resistance of cells comprising carbon electrodes with large pores (greater than about 13 nm). Electrolytes comprising high MW PEO display a change in conductivity about their LCST. As the ion-adsorption mechanism of MC electrodes is governed by ion-diffusion, it is expected that the electrochemical behavior of MC devices with the PEO/IL (50/50) electrolyte correlate with the conductivity measurements of these systems (FIG. 3c). Indeed, these cells initially show an initial decrease in RDL as the temperature increases, followed by a significant increase in capacitance, as evidenced by the increasing radius of the Nyquist semicircle (FIG. 5f) above 120° C. In carbon electrodes with large pores, electrochemical activity can be modulating using high MW PEO by inhibiting the ion conductivity between the electrodes.

Figure 6A:
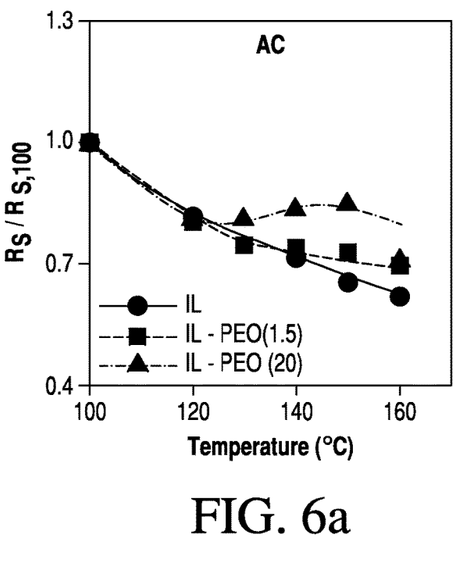
FIGS. 6a-d are graphs showing temperature dependence of the Ohmic and double layer resistances of AC and MC electrodes with RPEs.
Figure 6B:
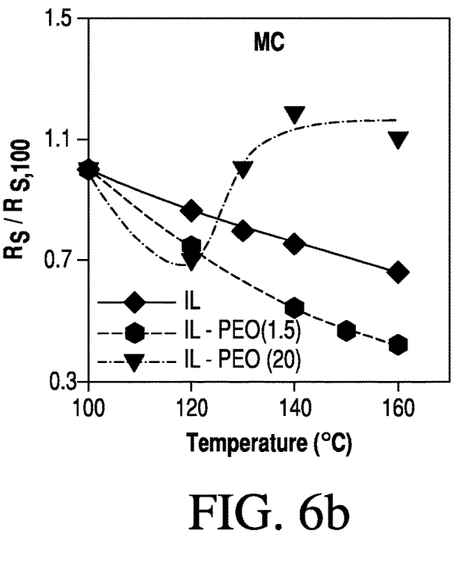
Figure 6C:
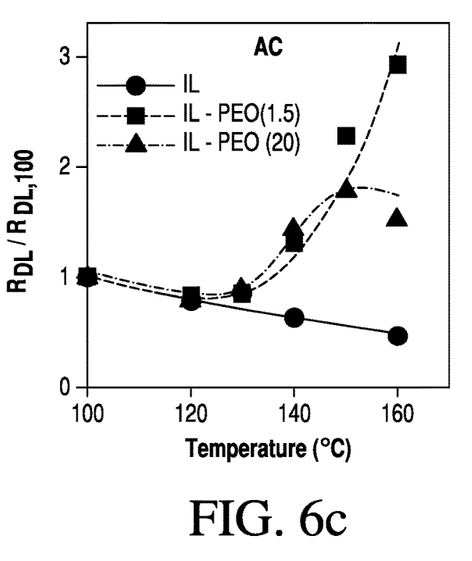
Figure 6D:
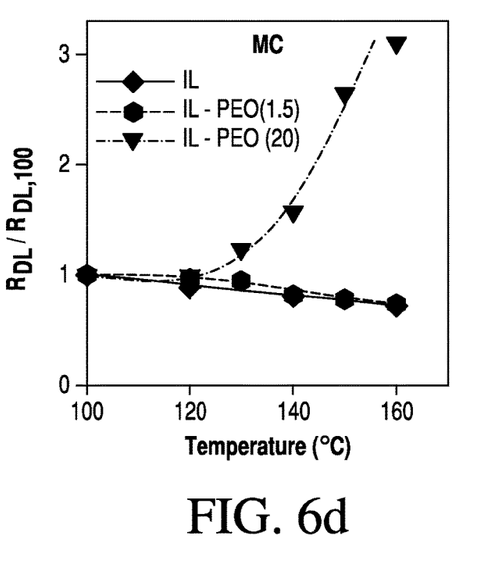

A summary of the changes for both the Ohmic resistance and double layer resistance over the temperature range of 100° C. to 160° C. is shown in FIGS. 6a-6d. Values for resistances at each temperature were modeled with a modified Randles circuit and normalized to the resistance at 100° C. to display each profile on the same plot. FIG. 6a shows how the Ohmic resistance (series) in the AC electrodes changed when using the pure IL, L-PEO/IL (50/50), and PEO/IL (50/50) electrolytes. As previously described, the solution resistance (which is a large component of the Ohmic resistance in the electrochemical cell) only increases the 20K MW PEO electrolyte, which exhibits a decrease in conductivity above the LCST. With the MC electrodes (FIG. 6b), a similar but more pronounced change in the Ohmic resistance is observed since the governing mechanism in these materials is ion-diffusion (under the test conditions). The double layer resistance in the AC electrodes is strongly affected by the phase transition of L-PEO/IL (50/50) and PEO/IL (50/50) electrolytes above their LCST (FIG. 6c). As expected, devices with pure IL electrolyte show a decrease in RDL as the temperature increases. Both the L-PEO/IL (50/50) and PEO/IL (50/50) electrolytes show a drastic increase in RDL when heated above their LCST. A more pronounced increase is seen in the AC electrodes with the L-PEO/IL (50/50), since the smaller PEO chains can infiltrate the nanoscale (about 2 nm) pores and absorb on the electrode surface. On the MC electrodes, the double layer resistance increases for devices with pure IL and L-PEO/IL (50/50), as both systems exhibit and increase in conductivity with increasing temperature (FIG. 6d). Cells with PEO/IL (50/50) electrolytes, however, show a 3-fold increase in RDL above the LCST, as expected due to the decrease in ion conductivity between the carbon electrodes, which reduces ion concentrations near the electrode surface. In summary, we have shown how a LCST phase transition can be used to modulate the electrochemical activity of electrode interfaces, which can be used to control the function of energy storage devices. Using electrolytes comprised of an ionic liquid, [EMIM][BF$_4$] and PEO, and Li+ salts, we showed that the solution conductivity can be designed to decrease when the temperature of the system increasing beyond the LCST of the mixture. Upon phase separation of PEO from the IL, the double layer resistance of carbon electrodes increases as a result of either polymer adsorption on the electrode interface (low MW PEO in 2 nm pores), or a decrease in conductivity which limits the ion concentration near the electrode surface (high MW PEO in greater than about 13 nm pores). Furthermore, the composition of PEO and IL, in addition to the concentration of Li+ salt, affect the temperature at which the transition occurs and the extent to which the conductivity can be decreased. The polymer systems disclosed herein are capable of altering both the Ohmic (solution) resistance and the double layer capacitance of carbon based devices. The electrolyte designs disclosed herein mitigate thermal hazards associated with cells and electrochemical devices overheating.

Lithium-ion battery cells were constructed using a lithium titanate (Sigma Aldrich) coated copper foil as the anode and a lithium iron phosphate coated aluminum foil (MTI Corp.) as the cathode. The electrodes were separated using a high-temperature stable non-woven mat separator (Dreamweaver, Intl.) soaked in an ionic liquid ([EMIM][BF$_4$]) (Ionic Liquid Technologies, 98+%) with 0.2-1 M LiTFSI (Sigma Aldrich) and 1-5 wt % poly(benzyl methacrylate). The thermally activated phase transition in these electrolytes varied with ionic content and polymer weight % in the ionic liquid electrolyte, which ranged between 90° C. and 150° C.

Figure 7A:
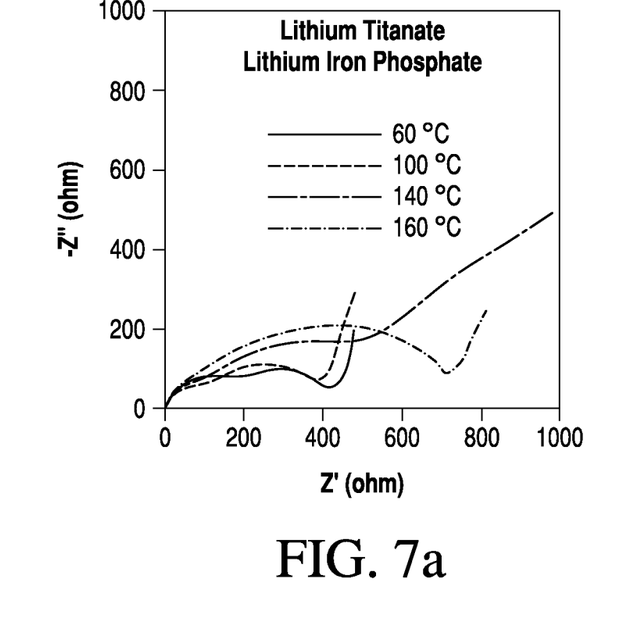
FIGS. 7a-b are graphs showing the performance of a lithium-ion battery comprising a lithium titanate anode, lithium iron phosphate cathode, and a non-woven mat separator soaked in [EMIM][BF$_4$] with 0.2 M LiTFSI and 5 wt % poly(benzyl methacrylate.
Figure 7B:
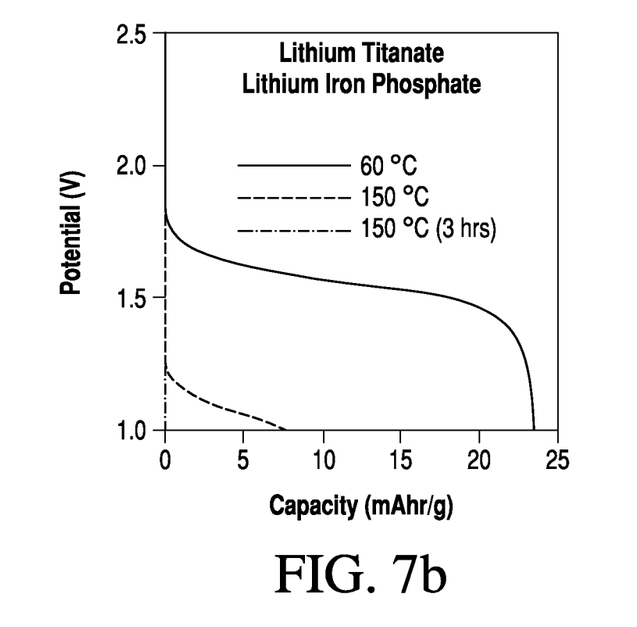

The temperature-dependent battery behavior of the lithium-ion cell comprising the high-temperature stable non-woven mat separator soaked in [EMIM][BF$_4$] with 0.2 M LiTFSI and 5 wt % poly(benzyl methacrylate) is shown in FIGS. 7a-b. In these cells, a significant increase in cell resistance is observed at temperatures above the thermal transition of the electrolyte (120° C.). As a result of the increase in internal resistance, the discharge voltage and power of the battery becomes limited, as shown in FIG. 7b. At 150° C., the battery exhibits a decrease in capacity, which eventually shuts off as the internal resistance in the cell becomes too high to deliver the specified current density.

FIGS. 7a-b show the performance of a lithium-ion battery comprising a lithium titanate anode, lithium iron phosphate cathode, and a non-woven mat separator soaked in [EMIM][BF$_4$] with 0.2 M LiTFSI and 5 wt % poly(benzyl methacrylate). FIG. 7a shows a Nyquist plot of the battery with increasing cell temperature from 60° C. to 160° C. FIG. 7b shows the constant current discharge characteristics of the cell at 60° C. and 150° C.

Examples

Polymer electrolyte solutions were prepared by mixing PEO (1,500 MW (Fluka), 20,000 MW (Polysciences)), ([EMIM][BF$_4$]) (Ionic Liquid Technologies, 98+%), and LiBF4 (Sigma Aldrich) while stirring at 90° C. under N$_2$ for 30 minutes. Once mixed, solutions were dried under vacuum (mTorr) at 90° C. while stirring for at least 12 hours, then immediately transferred and sealed in the electrochemical or spectroscopic test cells.

The cloud point of the PEO/[EMIM][BF$_4$]/LiBF$_4$ solutions was determined using optical transmittance. Electrolyte solutions were mixed and dried under vacuum (mTorr) at 90° C. while stirring for 12 hours then purged with nitrogen prior to transmission measurements. Temperature-controlled cells with sapphire windows were placed in a UV-Vis spectrophotometer (Varian Cary 50 Bio) and heated at a rate of 2° C./min while continually recording UV-Vis scans. An average transmittance was calculated over a range of wavelengths (600-800 nm). The cloud point or LCST was defined as the temperature at which the transmittance dropped below 80% of its initial value.

Carbon electrodes were prepared using a mesoporous carbon (Sigma Aldrich, surface area ~50-100 m2/g, average pore diameter 13.7 nm) and an activated carbon (MTI, surface area 2000 m2/g, average pore size 2.1 nm). Electrodes were prepared by dispersing the mesoporous (MC) or activated carbon (AC), conductive graphite (MTI), and poly(vinylidene fluoride) (Sigma Aldrich) in an 80/10/10 weight percent ratio in N-methyl-2-pyrrolidone (Acros). The resulting carbon pastes were then spread on 316 stainless steel sheets (60×60 mesh, roughly 20 mm×20 mm squares each). Electrodes were dried for at least 12 hours at 100° C. under vacuum and then soaked in their respective electrolyte (PEO-IL mixture) for at least 6 hours at 100° C. under vacuum (~30 in Hg) prior to electrochemical testing.

Electrochemical measurements were performed with a Gamry galvonstat/potentiostat in a 2-electrode setup using a split test coin cell (MTI, EQ-STC) mounted in a modified convection oven. Solutions were heated at approximately 2°

C./min and allowed to equilibrate at set temperatures for 30 minutes prior to electrochemical measurements. Bulk conductivity measurements were conducted on electrolytes between stainless steel electrodes separated by a poly(ether ether ketone) (PEEK) spacer over a temperature range of 70° C. to 180° C.

Electrochemical impedance spectroscopy (EIS) was performed over a frequency range of 1 Hz to 1 MHz (0V, 20 mV RMS). Ionic conductivity was determined from the corresponding resistive component of the impedance spectrum and calculated using a cell constant calibrated from a 1M NaCl solution at 25° C. Two electrode cells were constructed with either MC or AC electrodes, which were separated by a PEEK spacer and the PEO-IL electrolyte. Cells were characterized using cyclic voltammetry (CV) and EIS for the pure IL and PEO-IL electrolytes. CV scans were performed at 300 mV/s (MC) and 5 mV/s (AC) over a potential range of −1.0 to 1.0 V to demonstrate the symmetry of the cell. EIS analysis was performed over a frequency range of 100 mHz to 1 MHz (1V, 20 mV RMS) over a temperature range of 100° C. to 180° C.

According to additional aspects, the present disclosure further contemplates that thermally responsive electrolytes can comprise thermally responsive polymers that can be directed to preferentially adhere to electrodes in a predetermined fashion. In such a case, as the electrode temperature reaches a predetermined level, the thermally responsive polymers will undergo a phase transition, and reversibly form a coating, on the electrode interface, to achieve a predetermined level of thermal control, safety, and reversible shutdown, of a lithium-ion cell or lithium-metal cell system.

According to still further aspects, the present disclosure further contemplates that thermally responsive electrolytes disclosed herein can be incorporated into batteries for portable electronics, back-up power units, load-leveling systems, large-format stationary energy storage (e.g. renewable energy generation such as wind and solar), and high-power energy storage. Further contemplated applications that can benefit from the thermally responsive electrolytes disclosed herein include, sensors, anti-fouling interfaces and responsive interfaces, as well as self-healing materials. Virtually any system that relies upon a change in conductivity or electrochemical process or switching between a bare and covered surface (e.g. sensors) is contemplated as benefiting from the thermally responsive electrolytes disclosed herein.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A method comprising:
providing a lithium-ion cell, said cell comprising a thermally responsive electrolyte in an initial single phase solution, said thermally responsive electrolyte comprising:
    a thermally responsive polymer,
    a thermally stable ionic liquid; and
    a lithium salt;
separating the thermally responsive electrolyte into the biphasic mixture phase at temperatures ranging from about 50° C. to about 160° C.;
decreasing conductivity of the thermally responsive electrolyte in the biphasic mixture phase;
inhibiting lithium-ion cell operation when the lithium-ion cell is in the biphasic mixture phase;
reversing the thermally responsive electrolyte from the biphasic mixture at a temperature below about 50° C.;
wherein the thermally responsive electrolyte in the biphasic mixture phase has a conductivity that is less than the conductivity of the thermally responsive electrolyte in the initial single phase when the temperature of the thermally responsive electrolyte is in the temperature range of from about 50° C. to about 160° C.; and
wherein the thermally responsive electrolyte is configured to exhibit a reversible phase transition from the biphasic mixture phase to the initial single phase at a temperature below about 50° C.

2. The method of claim 1, wherein the thermally responsive electrolyte comprises a thermally responsive polymer selected from the group consisting of: poly(ethylene oxide) and other polyether derivatives; poly(aryl methacrylates), poly(alkyl methacrylates) and other poly(methacrylate) derivatives, poly(ionic liquids), copolymers or cross-linked polymers therein, and combinations thereof.

3. The method of claim 1, wherein thermally responsive electrolyte further comprises an ionic liquid, the ionic liquid selected from the group consisting of: imidazolium-, pyrrolidinium-, pyridinium-, phosphonium-, ammonium-, and sulfonium-based ionic liquids, and combinations thereof.

4. The method of claim 1, wherein the thermally responsive electrolyte further comprises a lithium salt, said lithium salt selected from the group consisting of: lithium tetrafluoroborate, lithium hexafluoroborate, lithium bis(trifluoromethanesulfonyl)imide, lithium perchlorate, and combinations thereof.

5. The method of claim 1, wherein the thermally responsive electrolyte in the biphasic mixture inhibits conductivity within the lithium-ion cell when the temperature of the electrolyte is in the range of from about 50° C. to about 160° C.

6. The method of claim 1, wherein the thermally responsive electrolyte in the biphasic mixture inhibits ion transport in the electrolyte.

7. The method of claim 1, wherein the thermally responsive electrolyte inhibits charge-transfer or ion intercalation when the temperature of the electrolyte is in the range of from about 50° C. to about 160° C.

8. A lithium-ion cell comprising:
a thermally responsive electrolyte, the thermally responsive electrolyte comprising:
    a thermally responsive polymer;
    a thermally stable solvent; and
    a lithium salt;
wherein, the thermally responsive electrolyte is configured to transition from an initial single phase to a biphasic mixture phase at a temperature of from about 50° C. to about 160° C.;
wherein thermally responsive electrolyte is configured to inhibit lithium ion cell thermal failure by interrupting lithium ion operation when the thermally responsive electrolyte is in the biphasic mixture phase;
wherein the thermally responsive electrolyte in the biphasic mixture phase has a conductivity that is less than the conductivity of the thermally responsive electrolyte in the initial single phase when the temperature of the thermally responsive electrolyte is in the temperature range of from about 50° C. to about 160° C.; and
wherein the thermally responsive electrolyte is configured to transition from the biphasic mixture phase to the initial single phase at a temperature below about 50° C.

9. The lithium-ion cell of claim 8, wherein the thermally responsive polymer is selected from the group consisting of: poly(ethylene oxide) and other polyether derivatives; poly(aryl methacrylates), poly(alkyl methacrylates), and other poly(methacrylate) derivatives, poly(ionic liquids), copolymers or cross-linked polymers therein, and combinations thereof.

10. The lithium-ion cell of claim 9, wherein the thermally responsive polymer has an average molecular weight of from about 1000 to about 1,000,000.

11. The lithium-ion cell of claim 8, wherein the solvent is an ionic liquid selected from the group consisting of: imidazolium-, pyrrolidinium-, pyridinium-, phosphonium-, ammonium-, and sulfonium-based ionic liquids, and combinations thereof.

12. The lithium-ion cell of claim 8, wherein the lithium salt is selected from the group consisting of: lithium tetrafluoroborate, lithium hexafluoroborate, lithium bis(trifluoromethanesulfonyl)imide, lithium perchlorate, and combinations thereof.

13. A component comprising the lithium-ion cell of claim 8.

14. A vehicle comprising the lithium-ion cell of claim 8.

15. A thermally responsive electrolyte comprising:
a thermally responsive polymer;
a thermally stable solvent;
a lithium salt;
wherein, the thermally responsive electrolyte is configured to transition from an initial single phase to a biphasic mixture phase at a temperature ranging from about 50° C. to about 160° C.;
wherein thermally responsive electrolyte is configured to inhibit lithium ion cell thermal failure by interrupting lithium ion cell operation when the thermally responsive electrolyte is in the biphasic mixture phase;
wherein the thermally responsive electrolyte in the biphasic mixture phase has a conductivity that is less than the conductivity of the thermally responsive electrolyte in the initial single phase when the temperature of the thermally responsive electrolyte is in the temperature range of from about 50° C. to about 160° C.; and
wherein the thermally responsive electrolyte is configured to transition from the biphasic mixture phase to the initial single phase at a temperature below about 50° C.

16. The thermally responsive electrolyte of claim 15, wherein the thermally responsive polymer is selected from the group consisting of: poly(ethylene oxide) and other polyether derivatives; poly(aryl methacrylates), poly(alkyl methacrylates), and other poly(methacrylate) derivatives, poly(ionic liquids), copolymers or cross-linked polymers therein, and combinations thereof.

17. The thermally responsive electrolyte of claim 15, wherein the thermally responsive polymer has an average molecular weight of from about 1000 to about 1,000,000.

18. The thermally responsive electrolyte of claim 15, wherein the solvent is an ionic liquid selected from the group consisting of: imidazolium, pyrrolidinium, pyridinium, phosphonium, ammonium, sulfonium-based ionic liquids, and combinations thereof.

19. The thermally responsive electrolyte of claim 15, wherein the lithium salt is selected from the group consisting of: lithium tetrafluoroborate, lithium hexafluoroborate, lithium bis(trifluoromethanesulfonyl)imide, lithium perchlorate, and combinations thereof.

20. The thermally responsive electrolyte of claim 16, wherein the thermally responsive polymer exhibits a predetermined phase transition at a temperature of from about 50° C. to about 160° C.

21. A component comprising the thermally responsive electrolyte of claim 15.

22. An energy storage component comprising the thermally responsive electrolyte of claim 15.

* * * * *